United States Patent
Geva et al.

(10) Patent No.: US 8,229,168 B2
(45) Date of Patent: *Jul. 24, 2012

(54) FAST LICENSE PLATE VERIFIER

(75) Inventors: Amir Geva, Yokneam (IL); Rutger Simonsson, Djursholm (SE); Jan Henrik Stromback, Lidingo (SE); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1090 days.

This patent is subject to a terminal disclaimer.

(21) Appl. No.: 12/033,899

(22) Filed: Feb. 20, 2008

(65) Prior Publication Data

US 2009/0208059 A1 Aug. 20, 2009

(51) Int. Cl.
G06K 9/00 (2006.01)
G06K 9/34 (2006.01)

(52) U.S. Cl. ........ 382/104; 382/100; 382/105; 382/173; 382/181

(58) Field of Classification Search .................. 382/100, 382/104, 105, 173, 181
See application file for complete search history.

(56) References Cited

U.S. PATENT DOCUMENTS

| | | | | |
|---|---|---|---|---|
| 5,155,683 A * | 10/1992 | Rahim | | 701/25 |
| 5,809,161 A * | 9/1998 | Auty et al. | | 382/104 |
| 5,842,194 A * | 11/1998 | Arbuckle | | 706/52 |
| 6,249,604 B1 * | 6/2001 | Huttenlocher et al. | | 382/174 |
| 6,285,780 B1 * | 9/2001 | Yamakita et al. | | 382/110 |
| 6,553,131 B1 * | 4/2003 | Neubauer et al. | | 382/105 |
| 6,747,687 B1 * | 6/2004 | Alves | | 348/148 |
| 7,388,978 B2 * | 6/2008 | Duvdevani et al. | | 382/145 |
| 7,873,218 B2 * | 1/2011 | Uzawa | | 382/199 |
| 2002/0080013 A1 | 6/2002 | Anderson | | |
| 2003/0081813 A1 * | 5/2003 | Astle | | 382/103 |
| 2004/0120571 A1 * | 6/2004 | Duvdevani et al. | | 382/149 |
| 2004/0263379 A1 * | 12/2004 | Keller | | 342/22 |
| 2005/0094852 A1 * | 5/2005 | Kumar et al. | | 382/107 |
| 2005/0238244 A1 * | 10/2005 | Uzawa | | 382/242 |
| 2006/0030985 A1 | 2/2006 | Lawida et al. | | |
| 2006/0187305 A1 * | 8/2006 | Trivedi et al. | | 348/169 |
| 2006/0188134 A1 * | 8/2006 | Quist | | 382/128 |
| 2006/0227041 A1 * | 10/2006 | Okamoto | | 342/174 |
| 2006/0269104 A1 * | 11/2006 | Ciolli | | 382/104 |
| 2006/0278705 A1 | 12/2006 | Hedley et al. | | |
| 2007/0005293 A1 * | 1/2007 | Maeda et al. | | 702/152 |
| 2007/0053590 A1 * | 3/2007 | Kozakaya | | 382/181 |
| 2007/0208681 A1 | 9/2007 | Bucholz | | |
| 2008/0031543 A1 * | 2/2008 | Nakajima et al. | | 382/284 |
| 2008/0123909 A1 * | 5/2008 | Kim et al. | | 382/125 |
| 2008/0281553 A1 * | 11/2008 | Frank et al. | | 702/150 |
| 2009/0015674 A1 * | 1/2009 | Alley et al. | | 348/144 |
| 2009/0173791 A1 * | 7/2009 | Pine et al. | | 235/454 |

FOREIGN PATENT DOCUMENTS

GB 2246894 A * 2/1992
JP 10063788 A * 3/1998

* cited by examiner

*Primary Examiner* — Jingge Wu
*Assistant Examiner* — Avinash J Yentrapati
(74) *Attorney, Agent, or Firm* — Daniel Kligler

(57) ABSTRACT

A method for identifying vehicles, including capturing a first image of a first vehicle using a first camera at a first position and a second image of the first vehicle using a second camera at a second position different from the first position. The method further includes determining a transformation between the first image and the second image. A third image of a second vehicle using the first camera is captured, and the transformation is applied to the third image to generate a fourth image of the second vehicle. The fourth image is analyzed, using a database of identified vehicles, to determine an identity of the second vehicle.

13 Claims, 6 Drawing Sheets

FIG. 3

| VEHICLE IDENTITY | | CAMERAS | | | | | | |
|---|---|---|---|---|---|---|---|---|
| LICENSE PLATE | INTERNAL | 24A | | 24B | | ... | 24H | |
| | | IMAGE | FEATURES, VALUES | IMAGE | FEATURES, VALUES | ... | IMAGE | FEATURES, VALUES |
| 11-111-11 | H1 | $H1^I_A$ | $\{(FA,[PA])\}_{H1}$ | $H1^I_B$ | $\{(FB,[PB])\}_{H1}$ | ... | -- | --- |
| | | | | | | | | |
| 1B-111-44 | H2 | $H2^I_A$ | $\{(FA,[PA])\}_{H2}$ | $H2^I_B$ | $\{(FB,[PB])\}_{H2}$ | ... | $H2^I_H$ | $\{(FH,[PH])\}_{H2}$ |
| | | | | | | | | |
| UWW 1234 | H3 | -- | --- | $H3^I_B$ | $\{(FB,[PB])\}_{H3}$ | ... | $H3^I_H$ | $\{(FH,[PH])\}_{H3}$ |
| | | | | | | | | |
| 3333 ABC | H4 | $H4^I_A$ | $\{(FA,[PA])\}_{H4}$ | -- | --- | ... | $H4^I_H$ | $\{(FH,[PH])\}_{H4}$ |
| | | | | | | | | |

FIG. 4

| | | SECOND CAMERA | | | |
|---|---|---|---|---|---|
| | | 24A | 24B | ---------- | 24H |
| FIRST CAMERA | 24A |  | $\overline{T_{AB}}$ | ---------- | $\overline{T_{AH}}$ |
| | 24B | $\overline{T_{BA}}$ |  | ---------- | $\overline{T_{BH}}$ |
| | | \| | \| | | \| |
| | 24H | $\overline{T_{HA}}$ | $\overline{T_{HB}}$ | ---------- | |

42

| | CAMERA | | | |
|---|---|---|---|---|
| | 24A | 24B | --- | 24H |
| CALIBRATION IMAGE | $c^I_A$ | $c^I_B$ | --- | $c^I_H$ |

FAST LICENSE PLATE VERIFIER

FIELD OF THE INVENTION

The present invention relates generally to vehicle identification, and specifically to identification using optical images.

BACKGROUND OF THE INVENTION

Hundreds of millions of vehicles move on highways and roads all over the world. Hence, it is of utmost importance to find cost-effective ways in order to manage and control this huge traffic. Areas of applications requiring reliable vehicle identification include:
- Identification of vehicles that made some kind of traffic violation
- Toll roads (including access control to centers of major cities)
- Parking access and payment
- Security A number of systems for vehicle identification are known in the art.

U.S. Patent Application 2006/0278705 to Hedley et al. is incorporated herein by reference. The Abstract states: Identifying a vehicle in a toll system includes accessing image data for a first vehicle and obtaining license plate data from the accessed image data for the first vehicle. A set of records is accessed. Each record includes license plate data for a vehicle. The license plate data for the first vehicle is compared with the license plate data for vehicles in the set of records. Based on the results of the comparison of the license plate data, a set of vehicles is identified from the vehicles having records in the set of records. Vehicle fingerprint data is accessed for the first vehicle. The vehicle fingerprint data for the first vehicle is based on the image data for the first vehicle. Vehicle fingerprint data for a vehicle in the set of vehicles is accessed. Using a processing device, the vehicle fingerprint data for the first vehicle is compared with the vehicle fingerprint data for the vehicle in the set of vehicles. The vehicle in the set of vehicles is identified as the first vehicle based on results of the comparison of vehicle fingerprint data.

U.S. Patent Application 2006/0030985 to Lawida et al. is incorporated herein by reference. The Abstract states: Vehicle recognition may be achieved by receiving multiple metrics from one or more vehicle sensors, analyzing the metrics to create a multi-metric vehicle identification profile comprising at least two of the multiple metrics, at least one result of the analyzing, or both, and matching the multi-metric vehicle identification profile against multiple stored vehicle sensor recordings.

U.S. Patent Application 2002/0080013 to Anderson et al. is incorporated herein by reference. The Abstract states: A license plate number for any vehicle extant within a field of view of an electronic camera is interpreted as a character sequence group in an image. Each character sequence group found in the image is converted to machine readable format by an optical character recognition engine and compared with a database having a plurality of license plate numbers and associated records. Each matching license plate number and associated record is displayed within the surveillance vehicle.

U.S. Patent Application 2007/0208681 to Bucholz is incorporated herein by reference. The Abstract states: A system for collecting, storing, linking and processing license plate data to provide compilations of information and displays of such compiled information. The system has a license plate reading system that may record time and location data in addition to license plate data, license plate image data, and image data of a vehicle. The data is collected over an extended period of time and stored for later searching. The data may be correlated, indexed and/or categorized in storage. The collected data may be compared to various existing or other databases and correlated and/or indexed to such databases. That collected data may be processed, searched, and/or analyzed for a variety of purposes.

U.S. Pat. No. 6,747,687 to Alves is incorporated herein by reference. The disclosure describes a "system for recognizing the same vehicle at different times and places."

Notwithstanding the above art, an improved system for vehicle identification would be advantageous.

SUMMARY OF THE INVENTION

In some embodiments of the present invention, a method and a computer software product for identifying vehicles are provided. The method and software product include the steps of capturing a first image of a first vehicle using a first camera at a first position, and capturing a second image of the first vehicle using a second camera at a second position different from the first position. From the images, a transformation between the first image and the second image is determined.

An image of a second vehicle using the first camera is captured, and the transformation is applied to the image to generate a transformed image of the second vehicle. The transformed image is analyzed, using a database of identified vehicles, to determine an identity of the second vehicle.

In an alternative embodiment of the present invention, apparatus for identifying vehicles includes a first camera which is located at a first position and which is configured to capture a first image of a first vehicle. The apparatus also includes a second camera which is located at a second position different from the first position and which is configured to capture a second image of the first vehicle. A processing unit is configured to determine a transformation between the first image and the second image.

The first camera captures an image of a second vehicle, and the processing unit applies the transformation to the image to generate a transformed image of the second vehicle. The processing unit analyzes the transformed image using a database of identified vehicles to determine an identity of the second vehicle.

The present invention will be more fully understood from the following detailed description of the embodiments thereof, taken together with the drawings, in which:

BRIEF DESCRIPTION OF THE DRAWINGS

FIG. 3 is a schematic diagram of a system database, according to an embodiment of the present invention;

FIG. 4 is a schematic diagram of a transformation table, according to an embodiment of the present invention;

DETAILED DESCRIPTION OF EMBODIMENTS

Figure 1:
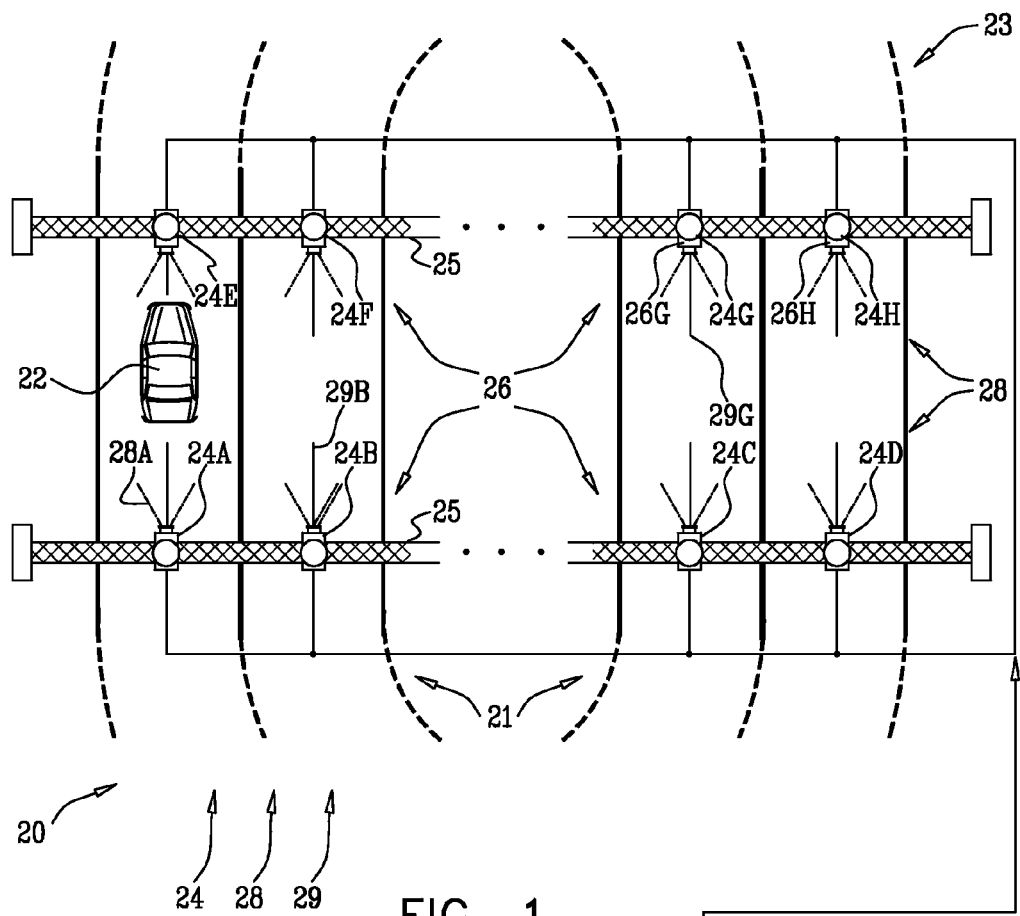
FIG. 1 is a diagram schematically showing a system for identifying vehicles, according to an embodiment of the present invention.
Figure 1:
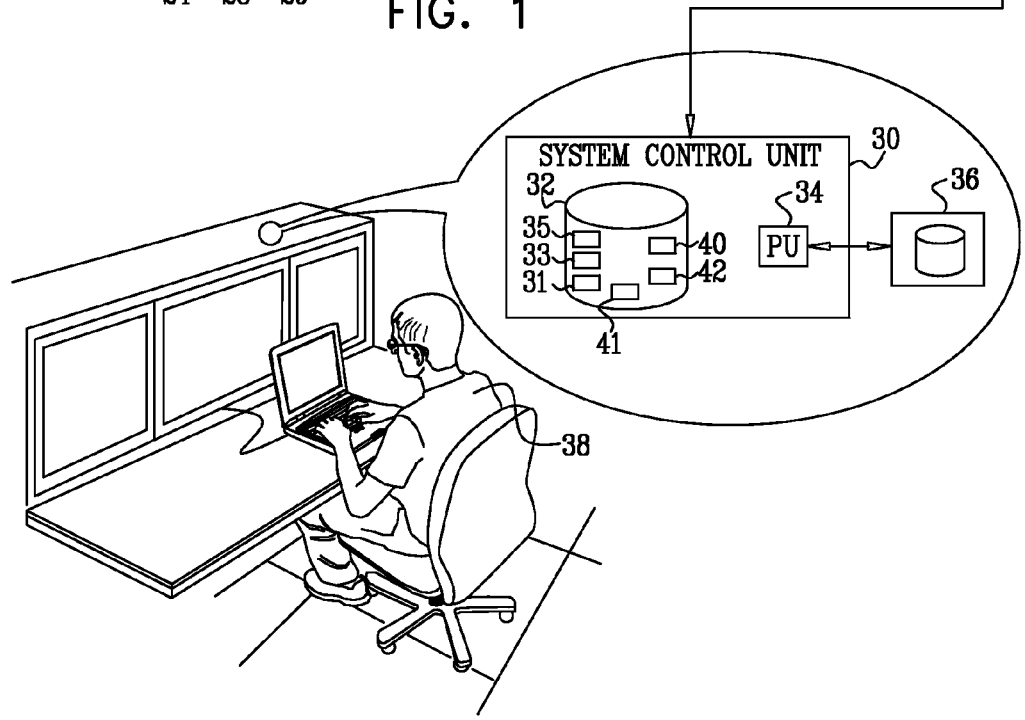

Reference is now made to FIG. 1, which is a schematic diagram of a system 20 for automatically identifying vehicles, according to an embodiment of the present invention. System 20 may be installed at an entrance or exit of a motorway network, or at any other appropriate location where vehicle identification is required. Such locations include, but are not limited to, parking facilities, traffic junctions, and sections of road that do not have junctions. Typical uses for the vehicle identification provided by embodiments of the present invention include billing for use of a motorway or parking facility, and issuance of punishments, warnings, commendations, or rewards for behavior in traffic. Hereinbelow, by way of example, system 20 is assumed to be operative at a multi-lane entrance 23 to a motorway network.

System 20 comprises an array of generally similar cameras identified generically as cameras 24. In this disclosure, elements that are generically identified by a numeral are individually identified by adding a suffix letter to the numeral. Thus, by way of example, FIG. 1 shows eight cameras 24A, 24B, . . . , 24G, 24H. Cameras 24 are configured to be under the overall operation of a system control unit 30, which comprises a processing unit (PU) 34. Control unit 30 may typically comprise a workstation wherein software 31 is installed and saved in a non-volatile memory 32, typically a computer disc. Software 31 operates system 20, and can be supplied to system 20 as a computer software product, in electronic form or on tangible media such as a magnetic storage disc or a compact disc which are readable by a computer, or by other means known in the art for permanent storage of electronic data. Control unit 30 is under overall control of an operator 38 of system 20.

System control unit 30 is assumed herein, by way of example, to be directly coupled to cameras 24. However, there is no necessity for such direct coupling, and cameras 24 may be coupled to control unit 30 by any other convenient means, such as by wireless or wired connections that may or may not use a network such as the Internet.

Cameras 24 typically comprise video cameras from which control unit 30 may receive still images of a vehicle 22. The cameras may be color cameras, black and white cameras, or a mixture of the two types. The cameras are mounted on a substantially fixed mounting framework 25 so as to image license plates of vehicles entering entrance 23. In the following description, two cameras are assumed to be mounted for each lane 21 of entrance 23. A first camera 24 in each lane is mounted to image the front license plate of a vehicle in the lane, a second camera 24 in the lane is mounted to image the rear license plate of the vehicle. However, there is no requirement for embodiments of the present invention to have two cameras per lane in the configuration described above. For example, other possible camera configurations are one camera per lane, two cameras per lane imaging the same license plate of a vehicle, or more than two cameras per lane. In the case of more than two cameras per lane, typically at least one of the cameras images the front license plate, and another camera images the rear license plate.

Each camera 24 is attached to framework 25 by a respective camera mount, generically identified herein as mounts 26. Mounts 26 may be substantially fixed, or alternatively, the mounts may be adjustable.

In the case of mounts 26 being adjustable, during normal operation of system 20 each mount 26 may be adjusted remotely by operator 38. Typically, each adjustable mount 26 has up to three linear degrees of freedom and up to three rotational degrees of freedom, so that, within limits set by physical characteristics of the adjustable mounts, operator 38 may adjust the position and direction of view of each individual camera. Each camera 24 is herein assumed to have a respective direction of view, generically identified herein as direction of view 29. In addition to being able to adjust the position and direction of view of each camera, the operator adjusts each camera's focus, and, in some embodiments, the operator may be able to also adjust each camera's field of view (FOV), generically identified herein as FOV 28. Operator 38 may also adjust imaging parameters, such as length of exposure and/or parameters for triggering the camera.

When system 20 is installed, each mount 26 and its attached camera are typically adjusted manually. After installation, from the point of view of operator 38, cameras 24 may be substantially completely fixed, partially fixed and partially adjustable, or substantially completely adjustable, depending on mounts 26. Typically, on installation, calibration images for each camera 24 are stored in a table 35 in memory 32. Memory 32 also comprises an image buffer 33. Table 35 and buffer 33 are described in more detail below.

PU 34 has access to a database 36 of valid license plate numbers that identify vehicles which are expected to be imaged in system 20. Database 36, also herein termed the license number database, may be accessed online, such as by a high speed connection via a network to a register of vehicle license numbers. Alternatively or additionally, at least part of license number database 36 may be stored in memory 32.

Factors such as weather, ambient temperature, collisions in the vicinity of a given camera 24, and aging of the camera and/or its mount 26 and/or framework 25 may all affect the direction and field of view of a camera, and the quality of the image produced by the camera, regardless of whether the camera is mounted fixedly or adjustably. Such changes may not be registered by PU 34, although, the results if the changes, i.e., the effect on the image, typically are registered by the processing unit. As described hereinbelow, embodiments of the present invention automatically compensate for such changes.

As is also described in more detail below, system 20 operates in a calibration mode and an operational mode. The two modes are typically implemented to operate in parallel, and the parallel method of operation is assumed in the description below. However, the two modes may operate in series, or in a combination of parallel and series implementations. In the calibration mode, PU 34 may store a calibration image for each camera 24 in table 35, described below with reference to FIGS. 6 and 7.

In the calibration mode PU 34 stores captured images of vehicles from different cameras 24, from which images the processing unit has been able to identify the vehicles. The images and other details are stored in a system database 40, described in more detail with reference to FIG. 3. PU 34 uses the images to generate transformations between the images, and stores the transformations in a transformation table 42, described in more detail with respect to FIG. 4. Database 40 and table 42 are stored in memory 32. As described with reference to flowchart 50 (FIG. 2) PU 34 may use database 40 and/or table 42 to identify vehicles.

In the operational mode, the processing unit captures an image of a vehicle entering system 20. The processing unit attempts to identify the vehicle using the captured image, by comparing information from the image, typically the license plate number of the vehicle, with information from the database of known, identified vehicles, database 36. If the comparison does not provide an identification, or if the identification is judged to have a low confidence level, the processing unit applies the transformations of table 42 to captured images of known vehicles, and compares the transformed images with the captured image to provide an identification. Both the calibration and operational modes use normalized images, and the process of normalization is described with reference to FIG. 2.

Figure 2:
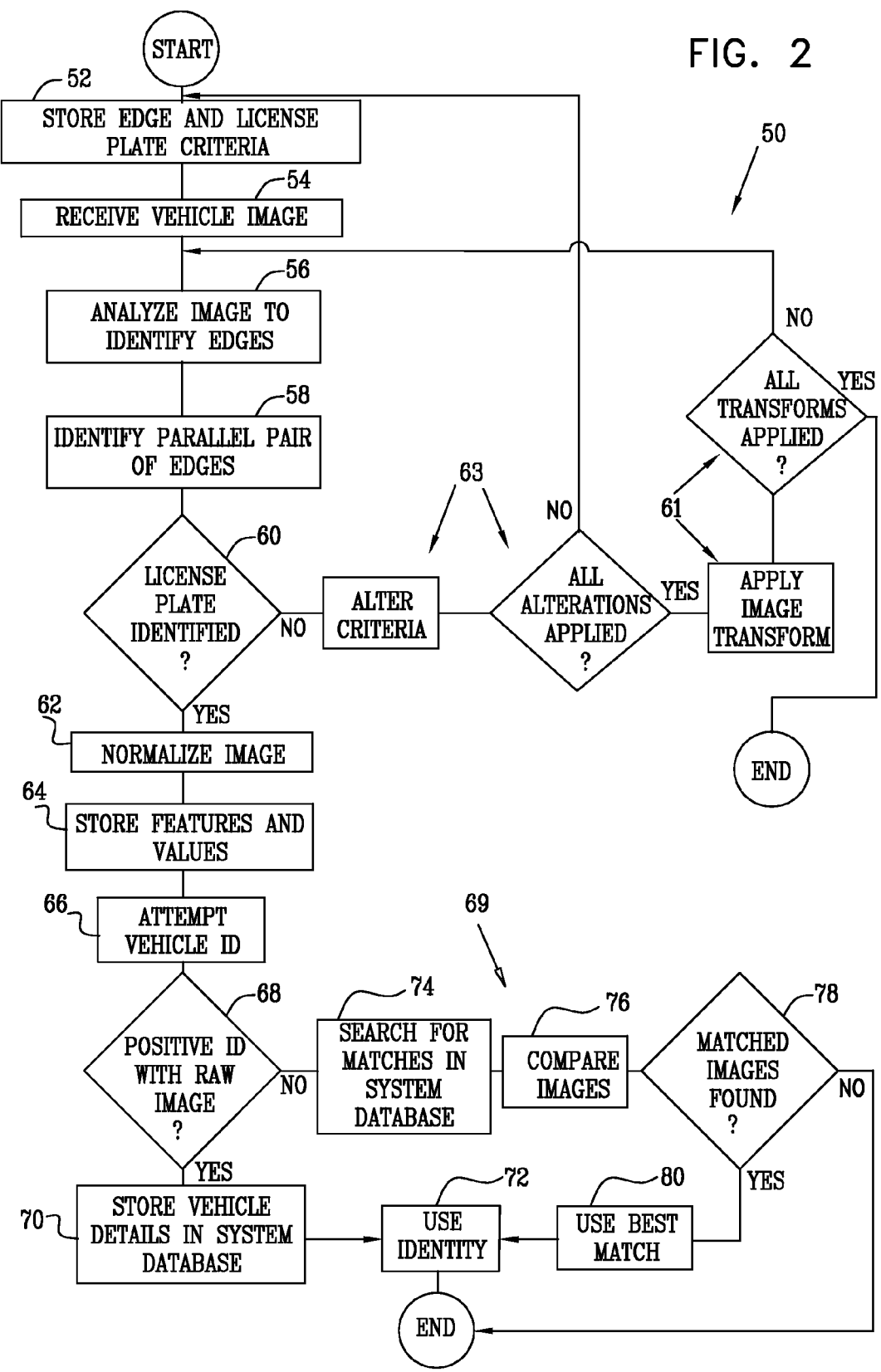
FIG. 2 is a flowchart showing steps for analyzing images of the system of FIG. 1, according to an embodiment of the present invention.
Figure 5:
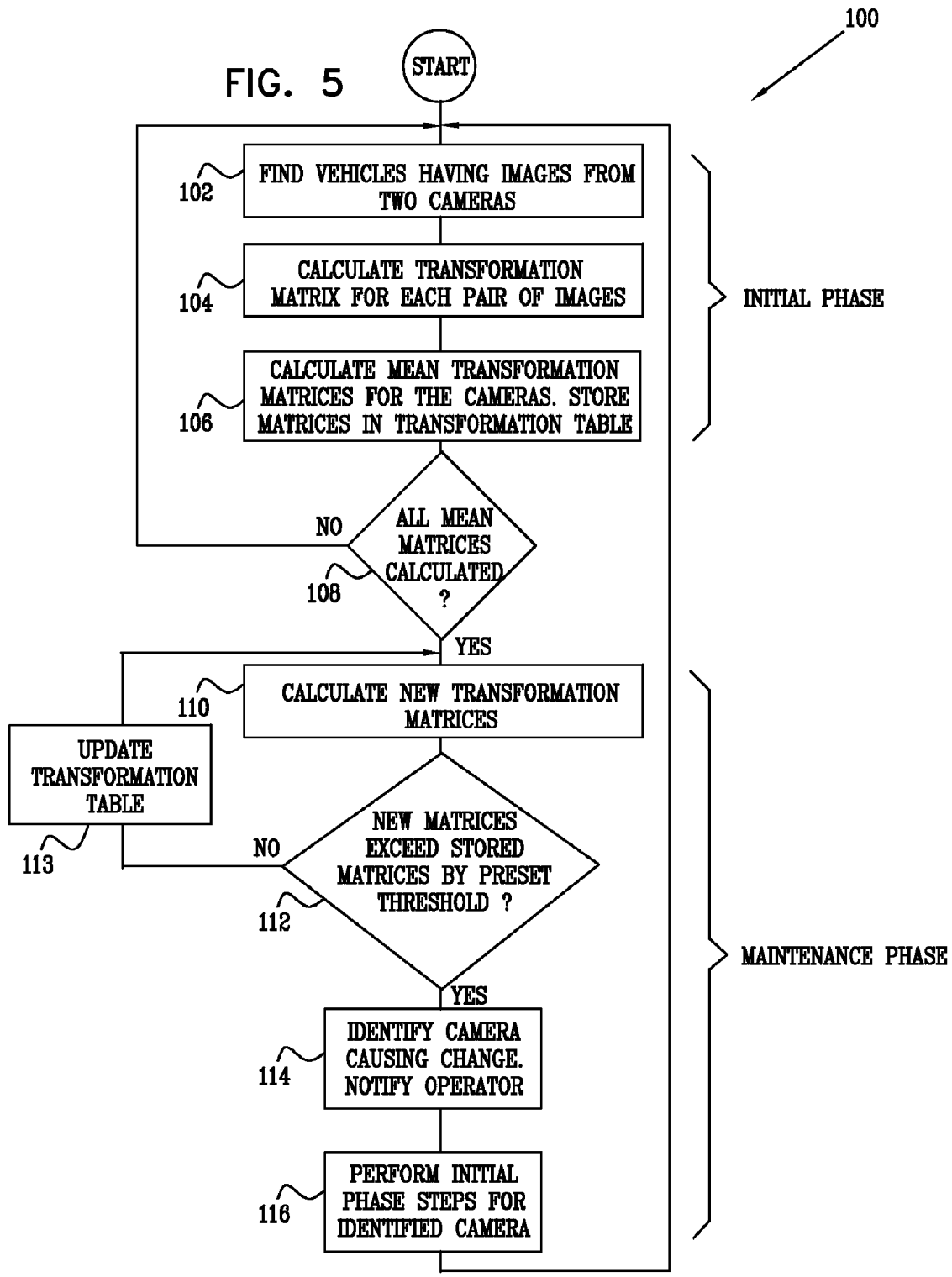
FIG. 5 is a flowchart of a process performed for a calibration mode, according to an embodiment of the present invention.

The operation of system 20 to identify vehicles, as described below with reference to the processes of FIG. 2 and FIG. 5, is typically completely automatic, involving no operator intervention except at initial setup of the system.

FIG. 2 is a flowchart of a process 50 for analyzing images, according to an embodiment of the present invention. Process 50 corresponds to the operational mode described above. PU 34 applies process 50 to each camera 24, and the following description is, by way of example, for camera 24A.

In an initial step 52, operator 38 stores edge determining criteria, and license plate identification criteria, in memory 32. Except as explained herein, the set of criteria are used by PU 34 to identify all vehicles, and are described further below. Other operations which may be performed in initial step 52 are described below.

The criteria may be generally fixed. Alternatively, in some embodiments of the present invention, the criteria may be adaptive. Further alternatively, there may be more than one set of criteria, typically adaptive, stored. Examples of how the criteria may be adaptively varied, and of different sets of criteria, are described further below.

In an image receiving step 54 PU 34 receives a captured image of a vehicle from camera 24A. The image may be of the front or the rear of the vehicle, and is herein, by way of example, assumed to be of the front. In the following description, the image received in step 54 is also referred to as a "raw" image.

In an edge detection step 56, the processing unit analyzes the raw image to identify edges in the image using the edge determining criteria stored in step 52. The criteria typically apply an edge detection algorithm to analyze the image. Such an algorithm typically uses differentials of intensity for gray scale images, and/or differentials of color parameters for color images, and values for the differentials may be included in the edge determining criteria. However, PU 34 may apply any convenient edge detection algorithm known in the art for identifying edges.

In a license plate identification step 58, PU 34 applies the license plate criteria of step 52 to identify at least one pair of parallel edges of a license plate. The criteria typically include acceptable ranges for the length of a horizontal edge, of a vertical edge, the distance between parallel edges, and the degree of parallelism of parallel edges. Criteria for edge lengths and the distance between edges are typically stored in terms of pixel numbers, and so may depend on imaging parameters of camera 24A. Criteria for parallelism are typically substantially independent of the camera imaging parameters. If two pairs of parallel edges are found that are approximately orthogonal, additional criteria such as a ratio of lengths of edges, and an angle between edges, may be used, and these criteria are also substantially independent of the camera imaging parameters.

In a first decision step 60, PU 34 analyzes results of step 58, to decide if a license plate has been identified in the raw image. If a plate has not been identified in the image and the criteria in step 52 are adaptive, the processing unit applies criteria changing steps 63 to try to identify a license plate.

In steps 63, PU 34 iteratively changes the criteria stored in step 52, in an attempt to identify a license plate. The changes may typically be an expansion or a contraction of one or more of the ranges, distances, and lengths described above. The operator may store the type of change, i.e., an expansion and/or a contraction, the amount of change to be applied at each iteration, and limits to the changes, in step 52.

In addition, other adaptive factors may be applied to the criteria. For example, camera 24A may relatively consistently determine that the license plates occur in a given region of the image, possibly because the camera is mis-aligned. Steps 63 may be configured to adjust the stored criteria, so that the image analysis of step 56 is initiated in the given region.

It will be understood that PU 34 may generate a set of criteria for each camera 24 in system 20, and each of the sets may be adaptive.

There may be more than one set of criteria stored in step 52. For example, after a number of license plates have been identified in the image, PU 34 may determine the criteria used to identify the license plates of specific models of a vehicle imaged by camera 24A, typically by accessing database 36 to determine models associated with the license plates. The processing unit may then generate a respective set of criteria for camera 24A for each different model, each model-set typically having different ranges than the set of criteria for all vehicles. For example, the license plate for one model may be partially obstructed to camera 24A, so that its set of criteria may be more relaxed than the sets for other cameras. The respective sets may also be adaptive, the processing unit typically modifying the criteria as camera 24A generates new images. In applying steps 63, the processing unit may apply the sets in sequence, typically starting with the set for all vehicles. Subsequent sets may be applied according to the popularity of models, as determined from database 36.

It will be understood that PU 34 may generate multiple sets of criteria for each camera 24 in system 20, and each of the sets may be adaptive.

If the criteria in step 52 are not adaptive, or if all possible changes have been made to the criteria in steps 63, the processing unit applies transformation steps 61 to try to identify a license plate. Steps 61 use image transformations that have been stored in transformation table 42 (FIG. 4).

In steps 61, PU 34 iteratively applies image transformations to the raw image, to generate transformed images. The image transformations are retrieved from transformation table 42, and the transformed images transform the raw image of camera 24A to transformed images apparently from cameras 24B, 24C, . . . . For each transformed image, the processing unit applies steps 56 and 58 to attempt to identify a license plate. If, after all transformations have been attempted, no license plate has been identified, process 50 ends, and the raw image may be forwarded to operator 38 for manual plate identification.

If a plate has been identified in the raw image or in one of the transformed images, then in a step 62 PU 34 normalizes the relevant image so as to produce a normalized image of the license plate. Typically the normalization comprises performing a geometric transformation on pixels of the image from step 60, including at least one of a translation, a dilation, and a rotation. The normalization forms the license plate image to have a preset width or height, to be centered in the image frame, and to have edges parallel to the edges of the image frame. The normalization may also include changing the intensity and/or color values of the original pixels so that a dynamic range of the license plate image is within preset limits.

In a step 64, the processing unit locates features of the normalized image, typically features within the bounds of the license plate image, although features outside the license plate image may also be located. Such located features include images of possible characters on the license plate, and other marks within, at the edges of, or in proximity to, the license plate, such as state/county/country identifiers, bolts or bolt holes, and/or license plate holders. PU 34 assigns a temporary identity to each of the located features. For each feature, the processing unit stores the temporary identity and numerical values of the pixels associated with the feature, i.e., the position of the pixels relative to the normalized license plate image, and the intensity and/or color value of each pixel.

In a step 66, PU 34 attempts to identify the vehicle generating the image. The processing unit converts features within the edges of the license plate image to alphanumeric characters, by applying an alphanumeric character matching algorithm to each of the features. The processing unit then accesses database 36 to correlate and compare alphanumeric characters, that have been recognized by converting the features, with valid license plate characters. The comparison may search for a match for all of a valid license plate with the characters identified by the processing unit. Alternatively, if PU 34 has recognized a character set less than a full set of characters for a license plate, the comparison may search for an appropriate match or matches with the less than full set of recognized characters.

In a second decision step 68, PU 34 analyzes the results of step 66 to determine if a positive identification of the vehicle can be made from the identified license plate characters. If the decision is positive and the image used in the analysis is the raw image, then in a step 70 of flowchart 50, the processing unit stores in system database 40 the vehicle identity, the identified features and feature values from step 64, and the raw image. The identified features and feature values, and the raw image, are indexed in the database according to the camera 24 providing the results. As described below, the results stored in database 40 may be used in flowchart 100.

In a final identity use step 72 of the process, the processing unit typically also provides the vehicle identity, date and/or time of imaging, position of the vehicle, and other relevant information to a vehicle billing or tracking program, or other type of program requiring vehicle identity.

If the result of the second decision step is negative, the processing unit attempts, in a set 69 of identification steps, to identify the vehicle by comparing the available features from step 64 with those of images previously stored in memory 32. Steps 69 comprise steps 74, 76, 78 and 80.

In a feature matching step 74, PU 34 searches in system database 40 for possible matches between the features and their values determined in step 64, and the features and values stored in the system database. Typically, more than one possible match may be found, in which case, in an image comparison step 76 the image from step 66 (raw or transformed) is compared with transformed images of the possible matched vehicles, using the transformations of table 42. In a decision step 78, the processing unit determines if one or more matching images have been found, and if this is the case, in a step 80 the vehicle identity having the best matching image is selected. The selected identity is used in step 72.

In steps 76, 78, and 80, in order to ensure that two images match with a high probability, operator 38 may set image matching thresholds in initial step 52. Typically, an image A is considered to match an image B if matching criteria are above a predetermined threshold, and if the separation of image A from any other image, using the same matching criteria, is greater than a predetermined separation. The threshold, separation, and matching criteria may be static, or alternatively the threshold and/or the separation and/or the matching criteria may be dynamic, varying to correspond with actual results. For example, if step 76 returns a relatively large number of closely matched images, the predetermined separation may be reduced, or the matching criteria may be tightened.

If decision 78 is negative, process 50 ends and the raw image may be forwarded to operator 38 for manual plate identification.

Process 50 ends after step 72 completes.

FIG. 3 is a schematic diagram of system database 40, according to an embodiment of the present invention. PU 34 adds entries into database 40 on an on-going basis, for each camera operating in system 20, as the entries are generated in step 70 (FIG. 2). As illustrated schematically in FIG. 3, database 40 comprises columns giving a vehicle identity, typically the license plate number, as well as an internal number Hi, where i is an integer, assigned by PU 34 when the data for the vehicle is stored. The database also holds images, $_{Hi}I_m$, and sets of pairs of features and feature values (Fm, [Pm]), where m is an index of the camera, Fm is a feature imaged by the camera, and [Pm] is a vector of the values of the feature. By way of example, FIG. 3 illustrates data for three cameras 24A, 24B, and 24H. As shown in the database, vehicle 11-111-11 has a raw image, features, and feature values from cameras 24A and 24B, but not from camera 24H. Vehicle 1B-111-44 has a raw image, features, and feature values from all three cameras. Typically, as system 20 continues to operate, fields that are initially empty in the database fill up, depending on traffic through entrance 23. Thus, if at a future date vehicle 11-111-11 is imaged and identified from the raw image by camera 24H, the raw image, features, and feature values of the features are stored in the appropriate fields of camera 24G. Typically, if there is an earlier raw image and its related data (features and their values) in database 40, the earlier raw image and data are overwritten by a later raw image and related data from step 70.

FIG. 4 is a schematic diagram of transformation table 42, according to an embodiment of the present invention. The matrix entries in transformation table 42 are generated by PU 34 according to a process 100, described below with reference to FIG. 5. The entries in the table are mean transformation matrices which transform an image $_{Hi}I_m$ to an image $_{Hi}I_n$ according to the equation:

$$_{Hi}I_n = \overline{T_{mn}} \cdot {}_{Hi}I_m \quad (1)$$

where $_{Hi}I_m$, $_{Hi}I_n$ are vectors representing images from cameras with indexes m, n, of a vehicle having identity Hi, and $\overline{T_{mn}}$ is the matrix transforming $_{Hi}I_m$ to $_{Hi}I_n$.

Thus, in table 42, $\overline{T_{AB}}$ is the matrix that transforms an image captured by camera 24A, the first camera in table 42, to the image that would have been captured by camera 24B, the second camera in the table.

As described above with reference to process 50 (FIG. 2) PU 34 accesses the transformation table if, in step 60 a license plate cannot be identified from a raw image. PU 34 also accesses the table in step 76 in order to compare images to positively identify a license plate number.

FIG. 5 is a flowchart of process 100 performed for the calibration mode, according to an embodiment of the present invention. Process 100 determines mean transformation matrices for table 42, and comprises an initial phase and a maintenance phase. In the initial phase, PU 34 develops image transformations between every pair of cameras in system 20, and enters the transformations as matrices $\overline{T_{mn}}$ in transformation table 42. In the following explanation, by way of example, PU 34 is assumed to develop image transformations between camera 24A and 24B, i.e., matrices $\overline{T_{AB}}$ and $\overline{T_{BA}}$. Process 100 includes steps to accommodate a change of camera imaging parameters due to, for example, aging of the camera.

In a first step 102 of process 100, PU 34 searches in system database 40, in entries for cameras 24A and 24B, for vehicles that have the same identity, and for which the database contains raw images. Using the exemplary database of FIG. 3, the vehicle with internal identity H1 has raw images $_{H1}I_A$ and $_{H1}I_B$, and the vehicle with internal identity H2 has raw images $_{H2}I_A$ and $_{H2}I_B$.

In a second step 104, for each set of raw images, PU 34 calculates corresponding transformation matrices, by solving equation (1) for the matrix. Each set of raw images yields a solution for the particular matrix, so that in the examples of database 40, the processing unit calculates two values for $T_{AB}$, and two values for $T_{BA}$. In practice, there are typically a large number of sets of images, so that, for example, rather than two values for $T_{AB}$, for each pair of cameras in system 20, the processing unit calculates many values of each matrix.

In an averaging step 106, the processing unit averages the values of $T_{AB}$ to give a mean transformation matrix $\overline{T_{AB}}$, and the values of $T_{BA}$ to give a mean transformation matrix $\overline{T_{BA}}$. The processing unit stores the mean transformation matrices in table 42.

Each mean transformation matrix such as $\overline{T_{AB}}$, herein generically termed $\overline{T_{mn}}$, is typically a product of two substantially independent matrices, a first mean matrix $\overline{_G T_{mn}}$ which is a function of the geometric factors differentiating images formed by the relevant two cameras, and a second matrix $T_L$ which is a function of the different lighting conditions for the two cameras. Thus, $$\overline{T_{mn}} = \overline{_G T_{mn}} \cdot T_L \quad (2)$$

Matrix $T_L$ typically adjusts the gray level gain and/or color balance between the two cameras due to the different lighting conditions, which, inter alia, depend on the time of day. In some embodiments of the present invention, the gray level gain and/or color balance required for all cameras 24 may be determined for different lighting conditions during setup of system 20, typically in initial step 52 of process 50, and the results stored in a lookup table 41 in memory 32. In calculating each mean transformation matrix $\overline{T_{mn}}$, PU 34 uses table 41 to determine $T_L$, by methods which will be apparent to those having ordinary skill in the art.

In a first decision 108, the processing unit determines if mean transformation matrices have been found for all pairs of cameras of system 20. On return of a negative answer, steps 102, 104 and 106 are repeated until all the transformations have been determined. Steps 102, 104, and 106 comprise the initial phase of process 100, and the processing unit typically sets the rate of repetition of the steps to be relatively high, until substantially all the matrices for the transformation table have been found.

If decision step 108 returns a positive answer, process 100 enters a maintenance phase, in which the processing unit, except as indicated below, may typically operate at a reduced rate, since any changes in the transformation matrices are normally relatively small and occur over a relatively long timescale.

In a first maintenance step 110, the processing unit calculates new transformation matrices as a new raw image is stored in system database 40. Typically, depending on demands on the processing unit, the calculation is not performed for every new image, but may be performed for a predetermined proportion of new images, for example 1:100.

In a checking step 112 PU 34 determines if the new transformation matrices exceed the corresponding stored mean transformation matrices by a preset threshold. If the check in step 112 returns a negative answer, in an update step 113 the processing unit uses the new transformation matrices to update table 42 by recalculating the mean matrices of transformation table 42. Typically, the average used to perform the recalculation is a moving average, so that changes in camera imaging parameters, typically because of aging, are automatically accounted for without requiring operator intervention.

In a step 114, which occurs if in step 112 PU 34 determines that the new transformation matrices exceed the preset threshold, the processing unit notifies the operator of a possible problem with the camera generating the new raw image. The problem may be caused by a relatively large change in the imaging parameters of the camera, for example by the camera being inadvertently moved, and/or by a vehicle colliding with the camera mount. Following the warning, the operator may or may not inspect the camera causing the change, so as to readjust the camera. The steps for process 100 described below assume that the camera is not readjusted.

Alternatively, operator 38 may have adjusted the camera via the processing unit. In this case the processing unit does not notify the operator of a possible problem. However, the processing unit may notify the operator, prior to the adjustment, of a possible extra load on the processing unit if the adjustment is implemented. The extra load that may be introduces is described in an update step 116.

In update step 116, the processing unit replaces the mean transformation matrices of the affected camera in transformation table 42 with new mean transformation matrices by performing the initial phase steps described above for the affected camera. Typically, the processing unit increases its rate of operation to the relatively high rate of the initial phase, so as to quickly update the transformation table.

It will be understood that process 100 includes changes in images caused by any change in camera parameters, including changes caused by the operator. It will also be understood that process 100 is typically completely automatic, and that operator intervention may only be required for steps 114 and 116.

A process 150 (FIG. 6) describes steps that may be taken by the processing unit in the case of a known change in camera parameters.

Figures 6, 7:
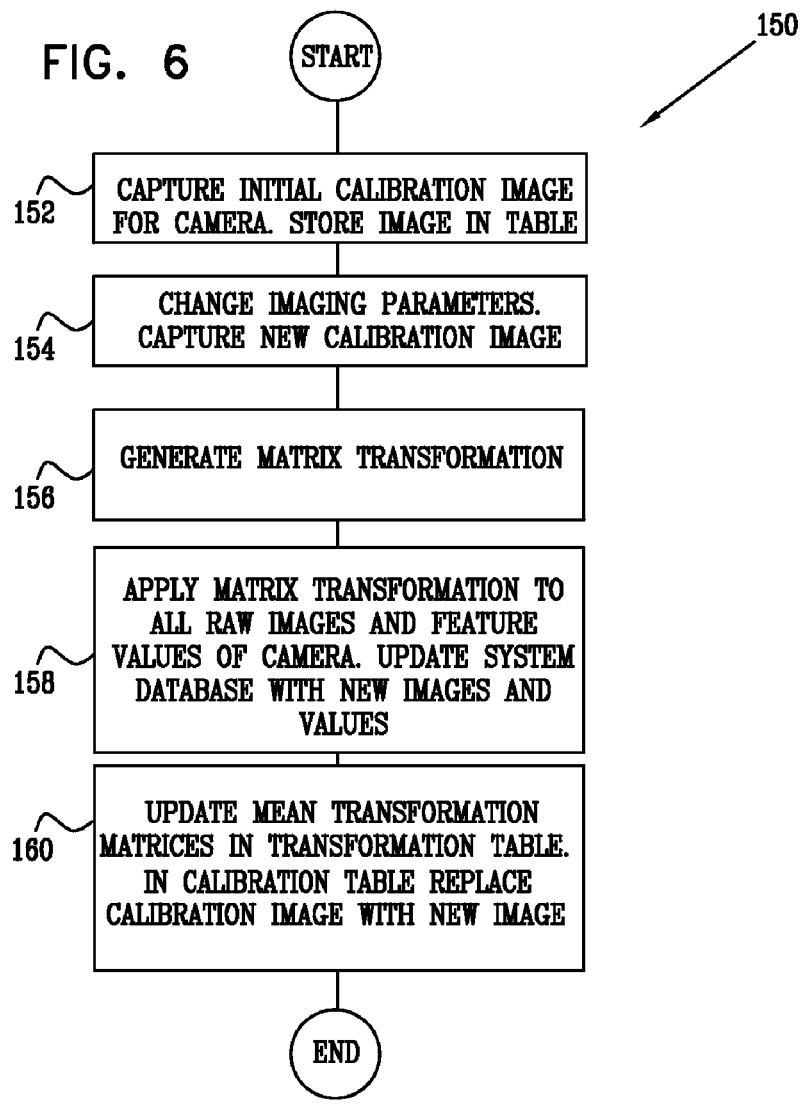
FIG. 6 is a flowchart of a recalibration process performed for the calibration mode, according to an embodiment of the present invention.
FIG. 7 is a schematic diagram of a calibration image table, according to an embodiment of the present invention.

FIG. 6 is a flowchart of recalibration process 150 performed for the calibration mode, and FIG. 7 is a schematic diagram of calibration image table 35, according to embodiments of the present invention. PU 34 typically performs process 150 when imaging parameters of a camera 24 have changed, such as by operator 38 changing the triggering, focus, field of view, and/or direction of view of a camera. In contrast to process 100, process 150 uses calibration images of cameras 24. By way of example, the steps of process 150 are described for camera 24A.

In a first step 152, which may advantageously be performed when system 20 is initially installed, PU 34 captures an initial calibration image, $_{c1}I_A$, for camera 24A, and the image is stored in calibration image table 35. The initial calibration image may be of any convenient target, such as a vehicle or a purpose-built diagram, that operator 38 locates in a known position in the camera's field of view. Alternatively, the initial calibration image may be the image, typically of the lane of the camera, captured by the camera when there is no vehicle in the camera's field of view.

In a second step 154 the imaging parameters of the camera are changed. If the changes are at the instigation of operator 38, or if the operator is aware that the changes are about to occur, step 152 may advantageously be repeated just before performing step 154. After changing the image parameters, PU 34 captures a new calibration image $_{c2}I_A$, with the new imaging parameters. PU 34 temporarily stores image $_{c2}I_A$ in buffer 33.

In a third step 156, PU 34 generates a matrix transformation $T_A$ for camera 24A, by solving equation (3):

$$_{c2}I_m = T_m \cdot {_{c1}I_m} \quad (3)$$

where $_{c1}I_m$, $_{c2}I_m$ are vectors representing initial and new calibration images from the camera having index m, and $T_m$ is the matrix transforming $_{c1}I_m$ to $_{c2}I_m$.

It will be understood that while equations (1) and (3) have the same general form, equation (3) is for a specific camera having an index m, and gives the matrix transformation for a change in imaging parameters of that camera.

In a fourth step 158, PU 34 applies the matrix transformation $T_A$ to transform all the raw images of camera 24A that are stored in system database 40, and the processing unit replaces the raw images with the new images generated by equation (3). Thus, referring to FIG. 3, PU 34 generates new raw images to replace the raw images for vehicles H1 and H2.

In addition, using a transformation generally similar to that for the images, the processing unit transforms feature values [Pm] in database 40, and updates the database with the new values.

In a final step 160, PU 34 updates the relevant mean transformation matrices of transformation table 42, using the new raw images stored in system database 40. Thus, in the example described herein the relevant transformations are those for camera 24A so that in FIG. 4 mean transformation matrices $\overline{T_{AB}}$, $\overline{T_{AH}}$, $\overline{T_{BA}}$, and $\overline{T_{HA}}$ are updated. PU 34 also replaces the calibration image stored in table 35 with that in buffer 33.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for identifying vehicles, comprising:
capturing a first image of a first vehicle using a first camera at a first position and a second image of the first vehicle using a second camera at a second position different from the first position;
determining a transformation between the first image and the second image;
capturing a third image of a second vehicle using the first camera; applying the transformation to the third image to generate a fourth image of the second vehicle; and analyzing the fourth image using a database of identified vehicles to determine an identity of the second vehicle;
capturing a fifth image of a third vehicle using the first camera and a sixth image of the third vehicle using the second camera;
determining an alternate transformation between the fifth image and the sixth image; and
determining a mean transformation as an average of the transformation and the alternate transformation, and wherein applying the transformation comprises applying the mean transformation;
capturing a seventh image of a fourth vehicle using the first camera and an eighth image of the fourth vehicle using the second camera;
determining a further transformation between the seventh image and the eighth image; and determining if the further transformation exceeds the mean transformation by a preset threshold;
and comprising, in response to a positive determination that the further transformation exceeds the mean transformation by the preset threshold, identifying a change in an imaging parameter of one camera chosen from the first camera and the second camera.

2. The method according to claim 1, wherein capturing the first image and the second image comprises identifying a license plate of the first vehicle in the first image and in the second image, and in response to identifying the license plate normalizing the first and second images to produce normalized first and second images, and wherein determining the transformation comprises determining the transformation in response to the normalized first and second images.

3. The method according to claim 1, wherein capturing the third image of the second vehicle comprises identifying a license plate in the third image and in response thereto performing a positive identification of the second vehicle.

4. The method according to claim 1, wherein capturing the first image using the first camera comprises providing license plate identification criteria to the first camera, and adaptively changing the criteria in response to an analysis of the first image.

5. The method according to claim 1, wherein capturing the third image comprises determining that the identity of the second vehicle cannot be found from the third image.

6. The method according to claim 1, wherein analyzing the fourth image comprises:
identifying a license plate in the fourth image;
recognizing at least some alphanumeric characters in the license plate; and
matching the at least some alphanumeric characters with license plate characters of known vehicles stored in the database to determine the identity.

7. The method according to claim 1, and comprising:
capturing a ninth image of the second vehicle using the second camera;
identifying the second vehicle from the ninth image; and
storing the ninth image in the database,
and wherein analyzing the fourth image comprises using the database to compare the fourth image with the ninth image so as to determine the identity of the second vehicle.

8. Apparatus for identifying vehicles, comprising:
a first camera which is located at a first position and which is configured to capture a first image of a first vehicle and to capture a third image of a second vehicle;
a second camera which is located at a second position different from the first position and which is configured to capture a second image of the first vehicle; and
a processing unit which is configured to determine a transformation between the first image and the second image, to apply the transformation to the third image to generate a fourth image of the second vehicle, and to analyze the fourth image using a database of identified vehicles to determine an identity of the second vehicle;
capturing a fifth image of a third vehicle using the first camera and a sixth image of the third vehicle using the second camera;
determining an alternate transformation between the fifth image and the sixth image; and determining a mean transformation as an average of the transformation and the alternate transformation, and wherein applying the transformation comprises applying the mean transformation;

capturing a seventh image of a fourth vehicle using the first camera and an eighth image of the fourth vehicle using the second camera;

determining a further transformation between the seventh image and the eighth image; and determining if the further transformation exceeds the mean transformation by a preset threshold;

and comprising, in response to a positive determination that the further transformation exceeds the mean transformation by the preset threshold, identifying a change in an imaging parameter of one camera chosen from the first camera and the second camera.

9. The apparatus according to claim 8, wherein capturing the first image and the second image comprises identifying a license plate of the first vehicle in the first image and in the second image, and in response to identifying the license plate normalizing the first and second images to produce normalized first and second images, and wherein determining the transformation comprises determining the transformation in response to the normalized first and second images.

10. The apparatus according to claim 8, wherein the processing unit is configured to apply license plate identification criteria including parallelism of edges to the first image, and in response thereto to identify a license plate of the first vehicle and perform a positive identification of the first vehicle.

11. The apparatus according to claim 8, wherein capturing the third image comprises determining that the identity of the second vehicle cannot be found from the third image.

12. The apparatus according to claim 8, wherein analyzing the fourth image comprises:
    identifying a license plate in the fourth image;
    recognizing at least some alphanumeric characters in the license plate; and
    matching the at least some alphanumeric characters with license plate characters of known vehicles stored in the database to determine the identity.

13. The apparatus according to claim 8, and comprising:
    capturing a ninth image of the second vehicle using the second camera;
    identifying the second vehicle from the ninth image; and
    storing the ninth image in the database,
    and wherein analyzing the fourth image comprises using the database to compare the fourth image with the ninth image so as to determine the identity of the second vehicle.

* * * * *